2,963,510
MIXED ANHYDRIDES OF HYPONITROUS AND CARBOXYLIC ACIDS

Gerald Scott, Manchester, and Leslie Seed, Northwich, England, assignors to Imperial Chemical Industries Limited, London, England, a corporation of Great Britain No Drawing. Filed Dec. 23, 1957, Ser. No. 704,260

Claims priority, application Great Britain Jan. 8, 1957

11 Claims. (Cl. 260—545)

This invention relates to mixed anhydrides and more particularly to mixed anhydrides especially useful as catalysts for the polymerisation of ethylenically unsaturated compounds.

According to the invention there are provided mixed anhydrides of hyponitrous acid and organic carboxylic acids.

In the case of monocarboxylic acids, the mixed anhydrides of this invention have the general formula

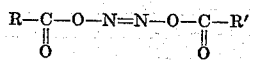

wherein R and R' stand for hydrogen, alkyl, cycloalkyl, aryl, alkyl/aryl or heterocyclic groups, unsubstituted or substituted for example with alkoxy, alkyl, cycloalkyl, or aryl groups or with halogens and may be the same or different. For example, R and R' may be members of the group consisting of alkyl, chloro-lower alkyl, lower alkoxy-lower alkyl, tetrahydrofuryl, 2,3-dihydrofuryl-5, carbo-lower alkoxy-lower alkyl, lower alkoxy-phenyl, chlorophenyl, lower alkyl-phenyl, α-tolyl and cinnamyl radicals. In the case of polycarboxylic acids, the mixed anhydrides of this invention may have a cyclic or polymeric structure, containing the following unit:

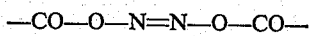

The mixed anhydrides may in general be prepared by interaction between silver hyponitrite and at least one organic carboxylic acid halide, preferably the chloride, of the formula

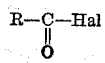

Other salts of hyponitrous acid, such as the lead, thallium, lithium, copper or potassium salts, may also be used.

The products of the reaction between silver hyponitrite and organic carboxylic acid halides are very unstable materials and may be obtained in forms of differing stability according to the conditions under which the reaction is carried out. The less stable forms are preferred for use as catalysts and their formation is favoured by performing the reaction in an inert reaction medium such as petroleum hydrocarbons, aromatic hydrocarbons, esters, ketones, chlorinated hydrocarbons, etc.; such media may be gaseous at normal temperatures but are liquid at reaction temperature. We find that the presence of tertiary bases or their salts, particularly pyridine and its hydrochloride, in the reaction mixture, increases substantially the yield of the less stable forms that are particularly effective as polymerisation catalysts. The proportion of the base may be very small, for example 0.005% of the reaction mixture; larger proportions may be used if desired. When ethereal solvents such as diethyl ether, tetrahydrofuran, diethyldiethylene glycol, di-n-butyl ether, etc. are used, higher proportions of stable products tend to be obtained, which at low temperatures are less effective polymerisation catalysts. This is connected with the tendency of these solvents to contain peroxides which are difficult to remove completely. These more stable products are also formed when impure silver hyponitrite, which may have been oxidised, is used.

Moreover, in order to obtain the less stable forms it is necessary to maintain a low temperature of the reaction mixture, in any event below 0° C. and preferably below —30° C. Temperatures as low as —110° C. may be successfully used. Short reaction times are desirable and may be favored by small particle size and an excess of the hyponitrite salt.

When sufficient time for reaction has elapsed the silver halide may be removed, for example by filtration, preferably forthwith. In some cases, for example using hydrocarbon solvents, products may be absorbed on the inorganic halide and may be eluted therefrom by treatment with a more polar solvent such as diethyl oxalate. It is sometimes the case that organic halide is also absorbed on the silver salt, and reaction conditions should be such that unreacted halide is not eluted. The so obtained solution of the mixed anhydride may be used as such, for example in the polymerisation of ethylenically unsaturated compounds, or the mixed anhydride may be isolated therefrom, for example by evaporation of the solvent at low temperature or by crystallisation at low temperature. The pure mixed anhydrides may be dangerously unstable and isolation is usually avoided.

By the processes described above, the mixed anhydrides may be prepared in good yield.

As examples of the mixed anhydrides of this invention there may be mentioned the mixed anhydrides of hyponitrous acid and carbonic acid, acetic acid, propionic acid, butyric acid, isobutyric acid, higher fatty acids such as lauric acid, similar acids with substituents on the alpha, beta, gamma, etc. carbon atoms of the fatty acid radical chain, for example trimethylacetic acid, trichloroacetic acid, tetrahydrofuroic acid, benzoic acid, p-ethoxybenzoic acid, 2:4:6-trimethoxybenzoic acid, o-chlorbenzoic acid, cinnamic acid, p-toluic acid, 2:3-dihydrofuran-5-carboxylic acid, oxalic acid, adipic acid, succinic acid, glutaric acid, sebacic acid, phthalic acid, isophthalic acid, 3:5:5-trimethyl hexanoic acid, trimesic acid, fumaric acid, itaconic acid, citraconic acid, alkoxyacetic acids or mixtures thereof. In the case of polycarboxylic acids the mixed anhydrides may contain unreacted acid halide groups.

The mixed anhydrides decompose with evolution of approximately equal proportions of nitrogen and carbon dioxide if the organic radical is large, and if the solvent in which the decomposition takes place is an efficient trap for radicals. In the case of the lower homologues in inert solvents substantial quantities of gaseous hydrocarbons may also be formed. Small proportions of nitrous oxide are often found in the decomposition products and these may be substantial when reaction conditions are such that the more stable products predominate.

The gases are evolved rapidly from the unstable mixed anhydrides at temperatures between —45° C. and room temperature, and the products of this invention are very active generators of free radicals in this temperature range, or at higher temperatures if very fast rates of generation of radicals are required. They are particularly useful as catalysts for the polymerisation and co-polymerisation of ethylenically unsaturated compounds including dienes, and in particular for the polymerisation of ethylene to give dense, solid polymers and of vinyl acetate and vinyl chloride, and other unsaturated compounds or their mixtures where fast polymerisation at low temperatures is advantageous. The more stable products of reactions carried out under unsuitable experimental conditions are less active in polymerization, particularly that of ethylene, but may have a limited use as blowing agents or free-radical generators at the higher temperatures.

The invention is illustrated but not limited by the following examples in which parts and percentages are by weight.

*Example 1*

7 parts of silver hyponitrite are stirred in 50 parts of A.R. acetone cooled to —40° C. A trace, roughly 0.005% of the reaction mixture, of pyridine hydrochloride is washed into the mixture using 10 parts of cooled A.R. acetone. Finally 4 parts of acetyl chloride and 40 parts of A.R. acetone cooled to —40° C. are added, this point marking zero reaction time. The whole is stirred for 1½ hours at —40° C., filtered at the same temperature and the residue washed with 100 parts of cooled acetone.

The concentration and yield of the mixed anhydride are calculated from the volume of nitrogen and nitrous oxide evolved on warming a measured sample of the solution. The solution begins to evolve gas at a measurable rate at —10° C. Analysis of the gas showed it to be: $N_2$ 36.0%, $N_2O$ <1.0%, $CH_4$ 25.0%, and $CO_2$ 35.5%. The yield of mixed anhydride is 98% of theoretical based on the weight of acetyl chloride used.

On cooling a 2.5% (w./v.) solution to —75° C. white crystals, which explode on isolation, are obtained.

*Example 2*

16 parts of silver hyponitrite are stirred at —40° C. in 50 parts of acetone and to it are added 8 parts of pyridine and 12 parts of acetone/HCl (0.0858 g./ml.), premixed to give a suspension of pyridine hydrochloride, cooled to the same temperature. Finally, 13.8 parts of hexanoyl chloride in 50 parts of acetone at —40° C. are added. The whole is stirred for a further 2 hours, filtered, and the residue washed with a further 120 parts of acetone, the low temperature being maintained throughout.

The yield of mixed anhydride calculated as in Example 1 is 99%. The solution evolves gas at a measurable rate at —5° C., the composition being 64% $N_2$, 42.5% $CO_2$ and <1.0% $N_2O$. White crystals separate out on cooling at 6% solution to —75° C. and detonate spontaneously on isolation.

*Example 3*

14 parts of silver hyponitrite are stirred at —40° C. in 50 parts of A.R. acetone. To this is added a trace, roughly 0.005% of the reaction mixture, of pyridine hydrochloride followed by 16 parts of octanoyl chloride in 50 parts of A.R. acetone cooled to —40° C. The whole is stirred for a further 2 hours, filtered and the residue washed with 150 parts of A.R. acetone, the low temperature being maintained throughout.

The yield of mixed anhydride calculated as in Example 1 is 45% of theoretical, based on the amount of chloride used. The solution begins to evolve gas at a measurable rate at —10° C.; analysis of the gas shows it to be 48.5% $CO_2$, 4% $N_2O$ and 44% $N_2$. White crystals isolated from the solution can be handled at —40° C. but decomposed with brisance when the temperature is allowed to rise slightly. The crystals are analysed for $N_2$ by sealing approximately 2 mg. in a small weighed capillary at a temperature of —50° C. The capillary is allowed to warm up to room temperature, when the hyponitrite is now decomposed, and reweighed. The capillary is broken in an atmosphere of $CO_2$ and the contents analysed by the normal Dumas method, the final measured volume of $N_2$ being converted in percent w./w. of original solid. Analysis of Cl by the Gröte technique is also carried out to confirm absence of acid chloride from the sample.

Analysis results show N 9.0% (N calculated for $CH_3(CH_2)_6COON=NOOC(CH_2)_6CH_3$ is 8.9) and Cl absent.

*Example 4*

30 parts of silver hyponitrite and 27 parts of diethyl acetyl chloride are stirred in 500 parts of dimethyl formamide at —50° C. for 2 hours and the mixture is then filtered. The yield of mixed anhydride calculated as in Example 1 is 36% theoretical based on the amount of chloride used. The solution evolves gas at a measurable rate at —10° C., the composition of total gas being $N_2O$ 25%, $N_2$ 17.5% and $CO_2$ 65%.

*Example 5*

17 parts of silver hyponitrite and 12.5 parts of ethoxyacetyl chloride are stirred in 350 parts of dimethyl formamide at —50° C. for 2 hours. The mixture was filtered at the same temperature. The yield of mixed anhydride calculated as in Example 1 is 32% theoretical based on the amount of chloride used. The solution on warming evolves gas of composition: $N_2$ 35%, $O_2$ 5%, $N_2O$ 14% and $CO_2$ 46%.

*Example 6*

17 parts of silver hyponitrite and 12 parts of trimethylacetyl chloride are stirred at —55° C. in 350 parts of dimethyl formamide for 2½ hours and then filtered at the same temperature. The yield of mixed anhydride calculated as in Example 1 is 38% based on the amount of chloride used. The solution evolves gas at a measurable rate of +4° C., the composition being $N_2$ 10%, $N_2O$ 30%, and $CO_2$ 63%.

*Example 7*

24 parts of silver hyponitrite and 6.4 parts of oxalyl chloride are stirred at —35° C. in 300 parts of diethyl oxalate for 1 hr. 40 mins. and then filtered at the same temperature. The yield of mixed anhydride calculated as in Example 1 is 18% based on the amount of chloride used, assuming both chlorine atoms replaced. The composition of the gas evolved on warming is $CO_2$ 27.5%, $N_2O$ 27%, $N_2$ 5% and CO 25%.

*Example 8*

60.7 parts of silver hyponitrite and 36.6 parts of adipyl chloride are stirred at —30° C. in 500 parts of acetone for 3 hours and then filtered. The yield of mixed anhydride calculated as in Example 1 is 25% based on the amount of chloride used and assuming both Cl atoms are replaced. The solution evolves gas at a measurable rate at —5° C., the composition being $N_2$ 33%, $N_2O$ 13%, $CO_2$ 57%, and a trace of $CH_4$.

*Example 9*

38 parts of silver hyponitrite and 30 parts of β carbomethoxy propionyl chloride are stirred at —40° C. in 500 parts of dimethyl formamide and then filtered at the same temperature. The solution evolved gas slowly on warming to 100° C., the composition being: $N_2O$ 45%, $CO_2$ 65%, and traces of CO and $O_2$. The yield of mixed anhydride calculated as in Example 1 is 12% based on the chloride used.

*Example 10*

4 parts of acetyl chloride and 2.1 parts of lithium hyponitrite are stirred in 200 parts of n-hexane at —35° C. and then filtered. The residue is washed with 150 parts of diethyl oxalate. The yield of mixed anhydride in diethyl oxalate solution, calculated as in Example 1 is 10% based on the acid chloride used.

*Example 11*

4 parts of acetyl chloride and 60 parts of silver hyponitrite are stirred in 200 parts of n-hexane at —35° C. for 1 hour and then filtered. The residue is washed with 150 parts of diethyl oxalate at —35° C. The yield of mixed anhydride in the diethyl oxalate solution calculated as in Example 1 is 31%. The solution on warming to 0° gives off gas of composition $N_2$ 35.5%, $CH_4$ 30%, and $CO_2$ 21.5%.

Example 12

7.9 parts of phenylacetyl chloride and 24 parts of silver hyponitrite are stirred for 2 hours at —70° C. in 300 parts of toluene. The yield of mixed anhydride calculated as in Example 1 is 5% based on the chloride used. The solution on warming gives off gas at +11° C., the composition being $N_2$ 7.5% and the rest $CO_2$.

Example 13

6.4 parts of acetyl fluoride and 24 parts of silver hyponitrite are stirred for 2 hours at —35° C. in 300 parts of n-hexane. The residue after filtration is washed with 250 parts of diethyl oxalate. The yield of mixed anhydride calculated as in Example 1 is 14% based on the amount of fluoride used. The solution decomposes at —5° C. to give a gas of composition $N_2$ 30%, $N_2O$ <5%, $CH_4$ 28%, and $CO_2$ 36%.

Example 14

14 parts of silver hyponitrite and 16.5 parts of 3:5:5-trimethylhexanoyl chloride are mixed in A.R. acetone according to the method in Example 3. The yield of mixed anhydride calculated as in Example 1 is 65% based on the chloride used. The solution on warming to 0° evolves gas of composition: $CO_2$ 53%, $N_2$ 35%.

Example 15

12.9 parts of lead hyponitrite and 6.3 parts of acetyl bromide are mixed in A.R. acetone according to the method of Example 3. The yield of mixed anhydride calculated as in Example 1 is 25% based on the bromide used. The solution on warming to —5° C. evolves gas of composition: $CO_2$ 15%, $N_2O$ 4.5%, $N_2$ 55%, and $CH_4$ 25%.

Example 16

3.7 parts lithium hyponitrite and 6.3 parts of acetyl bromide are mixed in A.R. acetone according to the method of Example 3. The yield of mixed anhydride calculated as in Example 1 is 46% based on the bromide used. The solution on warming to —5° C. evolves gas of composition: $CO_2$ 14.5%, $N_2O$ 4.5%, $N_2$ 64% and $CH_4$ 10%.

Example 17

8 parts of acetyl chloride and 24 parts of impure silver hyponitrite are stirred at —35° C. for 1½ hours in 300 parts of diethyl Carbitol which is known to contain peroxides, and then the mixture is filtered at the same temperature. The yield of mixed anhydride calculated as in Example 1 is 60% based on the chloride used. The solution on warming begins to give off gas at —5° C. but the major portion is evolved in the region 70°–100° C. The composition of the gas is $N_2O$ 63%, $CO_2$ 16%, $CH_4$ 9% and $N_2$ 12%.

Example 18

22 parts of lauroyl chloride and 24 parts of silver hyponitrite are mixed at —55° C. for 60 hours in 150 parts of dimethyl ether, and then the mixture filtered. The filtrate is evaporated at —60° C. and white crystals which are unstable at room temperature are obtained.

Example 19

22 parts of lauroyl chloride and 24 parts of silver hyponitrite are stirred for 65 hours at —40° C. in 100 parts of diethyl ether and the mixture filtered at the same temperature. The filtrate is cooled to —75° C. to remove unchanged chloride which is precipitated and filtered off. This filtrate is then evaporated to dryness. Analysis by the method of Example 3 shows 8.7% $N_2$. When the solid is allowed to warm to room temperature, evolution of gas is observed. The residual stable solid on analysis is shown to contain 3.9% $N_2$.

Example 20

2.76 parts of silver hyponitrite are added to a mixture of 19 parts of dimethyl formamide and 3.01 parts of o-toluyl chloride previously cooled to —40° C. in a stream of dry nitrogen. After stirring the reaction mixture for 2 hours at —40° C. the white residue is filtered and washed with dimethylformamide at —40° C. Gas evolution from the combined filtrates, as measured in an azotometer by collection over 50% KOH corresponds to an 11% yield of mixed anhydride decomposing at —5° C.

Example 21

2.76 parts of silver hyponitrite are added to a mixture of 19 parts of dimethylformamide and 2.77 parts of malonyl chloride, kept at —40° C. under a stream of dry nitrogen in five roughly equal portions over a period of 1 hour. After stirring the reaction mixture for a further 1¼ hours at —40° C. the white residue is filtered and washed with dimethylformamide at —50° C. Gas evolution from the combined filtrates as measured in an azotometer by collection over 50% KOH corresponds to a 19% yield of mixed anhydride decomposing at 90° C.

Example 22

A mixture of 19 parts of dimethylformamide and 3.96 parts of p-tert. butylbenzoyl chloride is stirred for 15 minutes at —40° C. under a stream of dry nitrogen, and 2.76 parts of silver hyponitrite added to the resulting solution. After stirring the reaction mixture at —40° C. for 2½ hours, the pale-coloured residue is filtered and washed with dimethylformamide. Gas evolution from the combined filtrates, as measured in the azotometer by collection over 50% KOH, corresponds to an 8% yield of mixed anhydride decomposing at —10° C. and a 4% yield decomposing at 30° C.

Example 23

2.76 parts of silver hyponitrite are added to a mixture of 19 parts of dimethylformamide and 3.07 parts of succinyl chloride, kept at —60° C., in five roughly equal portions over a period of 1 hour. After stirring the reaction mixture at —60° C. for 1 hour the temperature is increased to —40° C. and the stirring continued for a further 2½ hours, the whole reaction being carried out under a stream of dry nitrogen. The pale-coloured residue is filtered and washed with dimethylformamide at —60° C. Gas evolution from the combined filtrates, as measured in an azotometer by collection over 50% KOH, corresponds to a 10% yield of mixed anhydride decomposing at —10° C. and a 12% yield decomposing at 90° C.

What we claim is:

1. A process for the manufacture of mixed anhydrides of hyponitrous acid and organic carboxylic acids which comprises reacting, at a temperature below 0° C. and under anhydrous conditions a metal salt of hyponitrous acid and a halide of an organic carboxylic acid selected from the group consisting of alkanoic acids, chloro-substituted lower alkanoic acids, lower alkoxy-substituted lower alkanoic acids, tetrahydrofuoric acid, 2,3-dihydrofuran-5-carboxylic acid, carbo-lower alkoxy-lower alkanoic acids, lower alkoxy-benzoic acids, chloro-benzoic acids, lower alkyl-benzoic acids, cinnamic acid and phenyl-acetic acid.

2. Process for the manufacture of mixed anhydrides of hyponitrous acid and organic carboxylic acids as claimed in claim 1 in which the interaction is performed in an inert, non-aqueous reaction medium chosen from the group consisting of petroleum hydrocarbons, aromatic hydrocarbons, chlorinated hydrocarbons, esters, and ketones.

3. Process for the manufacture of mixed anhydrides of hyponitrous acid and organic carboxylic acids as claimed in claim 1 in which a member of the group consisting of pyridine and its salts is present in the reaction mixture.

4. Process for the manufacture of mixed anhydrides of hyponitrous acid and organic carboxylic acids as claimed in claim 1 in which the reaction mixture is maintained at a temperature below −30° C.

5. Process for the manufacture of mixed anhydrides of hyponitrous acid and organic carboxylic acids as claimed in claim 1 in which the organic carboxylic acid halide is selected from the group consisting of acetyl chloride and 3:5:5-trimethyl/hexanoyl chloride.

6. Mixed anhydrides of hyponitrous acid and organic carboxylic acids, having a structure represented by the general formula

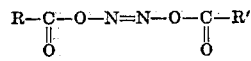

wherein R and R' represent radicals selected from the group consisting of alkyl, chloro-lower alkyl, lower alkoxy-lower alkyl, tetrahydrofuryl, 2,3-dihydrodihydrofuryl-5, carbo-lower alkoxy-lower alkyl, lower alkoxyphenyl, chlorophenyl, lower alkyl-phenyl, α-tolyl and cinnamyl radicals.

7. The mixed anhydride of hyponitrous acid and acetic acid.

8. The mixed anhydride of hyponitrous acid and 3:5:5-trimethylhexanoic acid.

9. A process for the manufacture of mixed anhydrides of hyponitrous acid and organic carboxylic acids which comprises reacting at a temperature below 0° C. and under anhydrous conditions a metal salt of hyponitrous acid and a halide of an organic dicarboxylic acid selected from the group consisting of phthalic acids, saturated aliphatic dicarboxylic acids and lower ethylenically-unsaturated aliphatic dicarboxylic acids.

10. A mixed anhydride of hyponitrous acid and a dicarboxylic acid prepared by the process of claim 9.

11. A process as claimed in claim 1 in which the salt of hyponitrous acid is silver hyponitrite.

No references cited.